United States Patent [19]

Beaty

[11] Patent Number: 5,634,959
[45] Date of Patent: Jun. 3, 1997

[54] SOLUBLE PLANT FOOD CONTAINING MICRONUTRIENTS

[76] Inventor: Clayton Beaty, 3697 Michigan Ave., Cleveland, Tenn. 37320

[21] Appl. No.: 415,688

[22] Filed: Apr. 3, 1995

[51] Int. Cl.$^6$ .............................. C05F 1/00; C05C 9/02
[52] U.S. Cl. ................................ 71/16; 71/23; 71/29
[58] Field of Search ................................. 71/16, 23, 29

[56] References Cited

U.S. PATENT DOCUMENTS

| | | | |
|---|---|---|---|
| 3,649,240 | 3/1972 | Bolduc | 71/64 DA |
| 4,043,788 | 8/1977 | Fryer | 71/29 |
| 4,383,845 | 5/1983 | Rutherford | 71/16 |
| 4,427,433 | 1/1984 | Parker et al. | 71/34 |
| 4,919,702 | 4/1990 | Weltzien et al. | 71/24 |
| 5,021,247 | 6/1991 | Moore | 426/69 |
| 5,125,952 | 6/1992 | Moore et al. | 71/28 |
| 5,264,017 | 11/1993 | Van de Walle | 71/61 |

OTHER PUBLICATIONS

Acadian Seaplants Ltd. Seaweed Extract Brochures and Product Information 1992 no month.

Primary Examiner—Ferris Lander
Attorney, Agent, or Firm—Miller & Martin

[57] ABSTRACT

A dry flowable fertilizer mixture is provided that contains soluble seaweed extract and fish solubles. Calcium silicate is added to the mixture to prevent excessive caking and thereby maintain the flowability of the fertilizer mixture. Chelated iron is also added to the mixture, preferably with EDTA. Chelated trace elements and micronutrients available from seaweed and fish solubles can thereby be made available to plants by applying a dilute solution of the fertilizer mixture.

19 Claims, No Drawings

SOLUBLE PLANT FOOD CONTAINING MICRONUTRIENTS

FIELD OF THE INVENTION

The present invention is directed to the formulation of a soluble plant food or fertilizer from largely natural ingredients containing all of the micronutrients essential for healthy and sustainable plant growth.

BACKGROUND OF THE INVENTION

It has long been known that the three most essential nutritional elements sought by plants for healthy growth are Nitrogen ("N"), Phosphorus ("P"), and Potassium ("K"). Along with carbon, hydrogen, and oxygen available from air and water, these macronutrients are the primary ingredients of plant growth. Most fertilizers are sold with N-P-K designations such as 13-13-13 or 20-10-10, to designate the respective levels of Nitrogen, Phosphorus and Potassium. Some common N-P-K formulations and their recommended uses follow:

1. 5-10-10 for annuals
2. 5-10-5 for perennials
3. 10-10-10 for bulbs
4. 21-7-14 for grass lawns Concentrated formulations according to the same ratios may also be used by merely adjusting the rate at which the fertilizer is applied. The most commonly used formulation for roses has traditionally been 15-15-15 in northern climates and 10-10-10 in warmer southern climates.

It has also been discovered that most plants require certain additional micronutrients and trace elements in order to exhibit the most robust growth characteristics. Such micronutrients and trace elements include iron and magnesium, which aid in plant photosynthesis, as well as boron, copper, iodine, zinc, calcium, manganese, and sulfur. It is believed that there may be additional micronutrients and functional compounds such as amino acids which also contribute to robust growth. Various natural and organic materials are often employed in plant feeding in hopes of supplying such unknown nutrients and functional compounds.

For instance, in the field of rose cultivation, rose growers have followed a variety of routines over the growing season in an effort to achieve the most robust growth possible. A popular protocol has involved the application of a water soluble 20-20-20 fertilizer one week; the application of magnesium sulfate the next week; the application of fish emulsion the following week; and the application of a product containing micronutrients and urea (a high nitrogen content ingredient) in the fourth week. Such protocols provided effective rose nutrition but at great expense of time and effort by rose growers. Attempts to mix the various ingredients together resulted in solutions in which some elements required by the plants precipitated out of solution and therefore failed to provide the desired plant nutrition.

Further difficulties have been encountered in trying to provide plant foods containing fish solubles, and soluble seaweed extracts. Problems with fish solubles include oiliness and odor. A particular problem with soluble seaweed extracts has been that seaweed extract absorbs moisture rapidly and therefore is difficult to mix as a dry fertilizer. If seaweed extract is successfully mixed, the resulting fertilizer mixtures tend to cake and therefore cannot easily be applied by the end user except by dissolving the entire package of fertilizer. This obviously presents a problem to the small or recreational gardener who may expect one package of fertilizer to last for several applications or even several months.

It is therefore an object of the present invention to provide an improved soluble plant food containing micronutrients that results in more robust plant growth.

It is a further object of the invention to provide a dry plant food containing fish solubles and soluble seaweed extracts that provides a dry flowable mixture without caking but which is completely soluble in water.

SUMMARY OF THE INVENTION

In accordance with the present invention, the foregoing objects and advantages are obtained by utilizing a combination of urea, ammonium phosphate, soluble muriate of potash, magnesium sulfate, fish solubles, soluble ascophyllum nodosum (seaweed extract), EDTA (ethylene diamine tetra acetic acid or chelated iron), and calcium silicate. Fertilizers created according to the present invention may be specially formulated for roses, lawns, pansies, annuals, evergreens, vegetable gardens and houseplants.

The urea is the primary source of nitrogen. Ammonium phosphate is the primary source of phosphorous, and the muriate of potash the primary source of potassium. Turning to the trace elements and micronutrients, magnesium sulfate obviously provides magnesium, while the EDTA provides a source of chelated iron and assists in balancing the pH of the product. The fish solubles and seaweed extracts provide numerous trace elements such as manganese, sulfur, molybdenum, iodine, silicon, zinc, copper and boron. The calcium silicate not only serves as a source of calcium, another vital micronutrient for plants, but also absorbs water and oil thereby conditioning the fertilizer mixture to resist caking so that the mixture remains flowable in its dry state.

Formulas made according to the present invention provide the necessary major nutritional elements or macronutrients for plant growth, together with micronutrients and trace elements. In addition, use of magnesium sulfate improves soil fertility and increases the cation exchange capacity of most soils. The large number of ingredients involved have been properly formulated so that all remain soluble without any elements precipitating to an insoluble form and thereby being made unavailable for plant use. The present invention is adapted to provide reliable fertilization without an imbalance or preponderance of any essential element for growth.

DESCRIPTION OF THE PREFERRED EMBODIMENT

As previously discussed, fertilizers according to the present invention are intended to be dissolved in water and thus delivered to the plant to provide a balanced food for plant growth. The mechanism by which nutrients are transferred to plant roots is called base exchange. Very small soil particles in colloidal suspension are negatively charged and attract positively charged elements such as potassium, sodium, calcium, magnesium, iron and copper. When a small plant rootlet moves into contact with a colloidal soil particle, it exchanges hydrogen ions for equivalent quantities of the mineral ions. These minerals are then taken up into the plant. Magnesium sulfate is included in the present fertilizer to help increase the cation exchange capacity of most soils.

Plants absorb their required amounts of hydrogen, carbon, and oxygen from water and air. As previously discussed, the other macronutrients necessary for plant growth are nitrogen, phosphorous and potassium. These basic macronutrients are also provided from soluble sources for immediate plant assimilation. The sources chosen for these macronutrients—urea, ammonium phosphate, and muriate of potash—are not novel and are commercially available in N-P-K ratios previously described. Nitrogen is provided primarily from urea, and to a lesser extent by the ammonium ion of the ammonium phosphate component. Nitrogen is vital for the formation of all new plant protoplasm. Chlorophyll is a nitrogen compound, and nitrogen is also heavily used by plants in forming stems and leaves. Blood, bone, or soybean meal or the dried residue of a manure or compost tea might also be used as substitute organic sources of nitrogen. Other nitrogen sources might include methylol urea, isobutylene urea or ammonia.

Phosphorus is provided largely by ammonium phosphate. Plants require phosphorus for photosynthesis, energy transfers within plants, and for good flower and fruit growth. Powdered bone meal, phosphate rock, phosphoric acid and ammonium polyphosphate might also be used as sources of phosphorus.

Potassium is provided largely by muriate of potash, and to a much lesser extent by seaweed. Potassium is used by plants in the manufacture and movement of sugars and in cell division. It is necessary for root development and helps plants to retain water. Other possible sources of phosphorus would be wood ashes, granite dust, potassium chloride, potassium nitrate, potassium sulfate, and potassium carbonate.

The novelty of the present invention is its ability to deliver not only the necessary macronutrients, but also a wide variety of micronutrients, functional compounds and trace elements in an effective manner. For instance, calcium is widely recognized as a necessary micronutrient which helps plants use nitrogen and is provided in the present invention largely by calcium silicate, and in fact most soils also have sufficient calcium for robust plant growth. However, calcium assimilation by plants is influenced by the quantity of magnesium, manganese and potassium present. Without sufficient calcium, plants will generally be retarded in growth. The present invention provides adequate calcium in plant usable form for robust growth.

Iron is another necessary micronutrient which in neutral or slightly alkaline soils will be precipitated as a hydrate or as iron phosphate and will thereby become unavailable to plants. The chelated iron present in both the EDTA and the seaweed extract of this invention does not suffer this shortcoming. Utilization of EDTA as a carrier of chelated iron also proves beneficial in lowering the pH of the fertilizer to a range of about 5.8–6.5 and preferably to about 6.0 to 6.4.

The trace elements that are necessary for robust plant growth present another problem. Many soils already contain sufficient trace elements for plant growth, but those elements remain locked into compounds that plants cannot use. To overcome this problem, it is desirable that a fertilizer avoid trace elements in chemical forms that might produce toxicity or result in reactions which would again lock those elements into unusable compounds. Instead, the present invention provides trace elements in the form of organic fish solubles and seaweed. It is believed to be much easier for plants to pull the necessary trace elements from organic compounds as most elements will be present in chelated form.

Although seaweed has been previously recognized as a desirable source of plant nutrients, including amino acids and suspected functional compounds, it has not heretofore been available in a complete dry fertilizer mixture. This is apparently due to the hydroscopic properties of seaweed and the resulting tendency of the fertilizer to cake and form solid blocks rather than remain in a dry flowable condition. The use of calcium silicate as a conditioner appears to inhibit the caking tendency of seaweed. The preferable form of calcium silicate is a commercially available formulation marketed as HUBERSORB 600 by the Chemicals Division of J. M. Huber Corporation of Havre de Grace, Md.

According to the precepts of the present invention, a 20-10-6 fertilizer has been developed according to the following formulation:

| | |
|---|---|
| Urea | 38.0% |
| Ammonium Phosphate | 26.5% |
| Muriate of Potash | 11.3% |
| Magnesium Sulfate | 9.0% |
| Fish Solubles | 8.7% |
| Soluble Ascophyllum Nodosum | 3.0% |
| EDTA | 2.5% |
| Calcium Silicate | 1.0% |

This formula offers a perfect balance of macronutrients, micronutrients and trace elements for supplemental feeding of roses. The formula of Example 1 has been used on roses and other flowering plants with outstanding results. One cup of dry fertilizer according to the present invention is first dissolved in a gallon of water and then mixed with approximately 16 gallons of water for direct application to roses or other flowering plants. This dilution of the mixture is sufficient to reduce the odor associated with fish solubles to an unobjectionable level.

In mixing the ingredients it is desirable to first mix all of the ingredients except the seaweed extract and calcium silicate. A dye may also be added to the mixture if desired. Finally, the seaweed extract, and preferably soluble ascophyllum nodosum, although other seaweed products (including marine algae) may produce acceptable results, is added to the mixture along with the calcium silicate, preferably the HUBERSORB 600 mentioned above. The addition of calcium silicate at this point prevents the seaweed extract from absorbing excessive moisture and thereby turning the entire fertilizer mixture into a sludge. If seaweed extract is introduced into the mixture at an earlier point, the mixture becomes so mud-like that an extremely high level of calcium silicate must be added to return the mix to a somewhat workable form.

One skilled in the art of fertilizer manufacture should be able to adapt the above recipe to produce a variety of N-P-K fertilizers for various plants. For instance, a 15-15-15 fertilizer is set out in Example 2, a 21-7-14 fertilizer is set out in Example 3, a 13-27-15 fertilizer is set out in Example 4, and a 10-20-20 fertilizer is set out in Example 5. Example 2 should be suitable for bulbs and roses.

| | |
|---|---|
| Urea | 19.0% |
| Ammonium Phosphate | 31.5% |
| Muriate of Potash | 26.3% |
| Magnesium Sulfate | 9.0% |
| Fish Solubles | 8.7% |
| Soluble Ascophyllum Nodosum | 3.0% |
| EDTA | 2.5% |
| Calcium Silicate | 1.0% |

These formulations 3, 4, and 5 would be considered desirable for lawns, perennials, and annuals, respectively.

| | | | |
|---|---|---|---|
| Urea | 36.0% | 6.9% | 12.0% |
| Ammonium Phosphate | 14.8% | 50.8% | 37.0% |
| Muriate of Potash | 26.0% | 18.1% | 26.8% |
| Magnesium Sulfate | 9.0% | 9.0% | 9.0% |
| Fish Solubles | 8.7% | 8.7% | 8.7% |
| Soluble Ascophyllum Nodosum | 3.0% | 3.0% | 3.0% |

-continued

| | | | |
|---|---|---|---|
| EDTA | 2.5% | 2.5% | 2.5% |
| Calcium Silicate | 1.0% | 1.0% | 1.0% |

In the various examples set forth, the quantities of magnesium sulfate, fish solubles, seaweed extract, EDTA, and calcium silicate remain unchanged. The primary reason for this is cost. High quality seaweed extract is relatively expensive and it is unlikely that formulations of soluble ascophyllum nodosum, also known as Norwegian Kelp extract, would be utilized in concentrations in excess of 5%. Concentrations of soluble ascophyllum nodosum are not believed to be mixable in a dry flowable fertilizer capable of reasonable storage in concentrations in excess of 10%. Use of substitute formulations comprised of less concentrated products such as ground dried kelp, marine algae or the like might be used in proportions of up to 12.5%. The fish solubles should also generally comprise less than 15% of the fertilizer mixture. Fish solubles are oily and also impart an obvious and generally unpleasant odor to the dry flowable fertilizer mixture. In very high concentrations fish solubles would make even the fully diluted product quite fragrant. The fish solubles and seaweed extract provide nutrients in complex and organic chemical forms that are generally more slowly absorbed by plants. Moreover, the seaweed extract is comprised of about half organic matter, which is a desirable soil additive, and additionally contains carbohydrates, amino acids and naturally occurring plant growth—promoting substances, all of which combine to promote robust plant growth.

Magnesium sulfate should be used in concentrations of less than 15% and preferably less than 10%, not only because of cost but also because the presence of magnesium in excessive quantities may cause reactions that make it difficult for plants to absorb sufficient calcium. EDTA provides approximately 10% by weight in iron absorbable by plants, and is preferably present in concentrations from 1% to about 5%. The chelated iron from the EDTA thereby provides between about 0.1% and 0.5% total absorbable iron in the final mixture. EDTA proves especially useful as it lowers the pH of the resulting mixture to the range of about 5.8 to 6.5. Other forms of chelated iron may be substituted in order to provide up to about 0.6% total absorbable iron. In such cases it may be necessary to also admix an acidic material such as sulphuric acid or acetic acid which are nontoxic, economical, and useful in fertilizers to adjust the resulting pH. The calcium silicate conditioner preferably is present in concentrations of about 0.5% to 3%, although 1% appears to produce the most satisfactory results at a reasonable cost. Concentrations of less than 0.5% do not appear to be effective in preventing caking. As previously mentioned, HUBERSORB 600 at 1% concentrations is the preferred ingredient at this time, although a 2% concentration of ZEOLEX 201, available from the Chemicals Division of J. M. Huber Corporation, also appears acceptable.

Numerous minor alterations and modifications of the compositions herein described will suggest themselves to those skilled in the art. It will be understood that all such alterations and adaptations that do not depart from the spirit of the invention are intended to be included within the scope of the appended claims.

What is claimed is:

1. A dry flowable fertilizer comprising:
   (a) at least 1% and less than about 12.5% soluble seaweed products;
   (b) at least 3% and less than about 15% fish solubles;
   (c) at least 3% and less than about 15% magnesium sulfate;
   (d) at least 0.5% and less than about 3% calcium silicate;
   (e) additional soluble sources of nitrogen sufficient to provide a total of at least 5% and less than about 82.5% nitrogen;
   (f) additional soluble sources of potassium sufficient to provide a total of at least 5% and less than about 82.5% potassium; and
   (g) additional soluble sources of phosphorus sufficient to provide a total of at least 5% and less than about 82.5% phosphorus.

2. The dry flowable fertilizer of claim 1 further comprising at least 0.1% and less than about 0.6% soluble chelated iron.

3. The dry flowable fertilizer of claim 2 wherein the pH of the fertilizer is in the range of about 5.8 to 6.5.

4. The dry flowable fertilizer of claim 1 wherein the soluble seaweed extract is present in the range of about 1% to 12.5%.

5. The dry flowable fertilizer of claim 1 wherein the fish solubles are present in the range of about 3% to 15%.

6. The dry flowable fertilizer of claim 1 wherein the magnesium sulfate is present in the range of about 3% to 15%.

7. The dry flowable fertilizer of claim 1 wherein the calcium silicate is present in the range of about 0.5% to 3.0%.

8. The dry flowable fertilizer of claim 1 wherein the soluble sources of nitrogen are selected from the group consisting of urea, methyl urea, isobutylene urea, ammonia, ammonium phosphate, ammonium polyphosphate, blood and manure.

9. The dry flowable fertilizer of claim 1 wherein the soluble sources of potassium are selected from the group consisting of muriate of potash, potash, potassium chloride, potassium nitrate, potassium sulfate and potassium carbonate.

10. The dry flowable fertilizer of claim 1 wherein the soluble sources of phosphorus are selected from the group consisting of ammonium phosphate, ammonium polyphosphate and phosphoric acid.

11. A dry flowable fertilizer comprising:
    (a) between about 2% and about 10% soluble seaweed extract;
    (b) between about 6% and about 12% fish solubles;
    (c) between about 6% and about 10% magnesium sulfate;
    (d) between about 0.5% and about 3% calcium silicate;
    (e) between about 0.1% and about 0.5% additional soluble chelated iron;
    (f) additional soluble sources of nitrogen, potassium, and phosphorus.

12. The dry flowable fertilizer of claim 11 wherein between about 0.1% and about 0.5% of additional soluble chelated iron is supplied by between about 1% to about 5% of EDTA.

13. The dry flowable fertilizer of claim 12 wherein the pH of the fertilizer is in the range of about 6.0 to 6.4.

14. The dry flowable fertilizer of claim 11 wherein the additional sources of nitrogen are sufficient to provide total nitrogen of between 5% and 30% by weight.

15. The dry flowable fertilizer of claim 11 wherein the additional sources of potassium are sufficient to provide total potassium of between 5% and 25% by weight.

16. The dry flowable fertilizer of claim 11 wherein the additional sources of phosphorus are sufficient to provide total phosphorus of between 5% and 30% by weight.

17. A dry flowable fertilizer comprising:
(a) between about 2% and about 5% soluble seaweed extract;
(b) between about 5% and about 12% fish solubles;
(c) between about 6% and about 10% magnesium sulfate;
(d) between about 1% and about 2% calcium silicate;
(e) between about 0.1% and about 0.5% additional soluble chelated iron; and
(f) additional soluble sources of nitrogen, potassium and phosphorus.

18. The dry flowable fertilizer of claim 17 wherein the soluble seaweed extract is soluble ascophyllum nodosum.

19. The dry flowable fertilizer of claim 17 wherein the pH of the fertilizer between about 6.0 and 6.4.

* * * * *